Patented July 8, 1952

2,602,749

UNITED STATES PATENT OFFICE 2,602,749

FROZEN CONFECTION

Kenneth R. Brown, West Chester, Pa., assignor to Atlas Powder Company, Wilmington, Del., a corporation of Delaware No Drawing. Application October 23, 1948, Serial No. 56,265

3 Claims. (Cl. 99—136)

This invention relates to improved ice cream mixes, frozen confections and the like and to improved methods of preparing such food products.

One of the objects of the present invention is to provide an ice cream of improved texture. Another object is to provide ice cream mixes with which overrun is obtained quickly during the freezing process. Other objects of the invention will be apparent from the description which follows and the appended claims.

In modern ice cream practice it is customary to include in the freezing mixture agents other than cream, milk, sugar and flavoring, for the purpose of controlling the consistency and texture of the finished product and more particularly for the purpose of increasing the speed with which air is stably incorporated in the freezing mixture to the extent necessary for imparting desired "lightness" to the finished product. Thus gelatin is added to aid in emulsifying the fat particles of the cream, and to give the frozen product a firm body. Frequently viscosity modifiers and/or crystallizing inhibitors such as alginates, pectin, Irish moss, and the like are added to impart smoothness as well as firmness to the final product.

More recently it has been proposed to add to ice cream mixes fatty acid esters containing at least one free hydroxyl group per mol of ester, which agents apparently are especially useful in hastening the incorporation of air during whipping so that the required overrun is reached quickly, thus affording economies of operation.

In accordance with the present invention hydroxyl free fatty acid esters of polyoxyethylene diols are incorporated in ice cream mixtures to yield final products of excellent texture and consistency, which mixtures may be processed in short time because of the rapidity with which the desired overrun is obtained.

The addition agents in the ice cream mixes of my invention may be represented by the following generic formula:

$$R_1OCH_2(CH_2OCH_2)_nCH_2OR_2$$

wherein $R_1$ and $R_2$ may be the same or different and represent acyl radicals of fatty acids containing from 12 to 20 carbon atoms and containing not more than one carbon to carbon double bond per hydrocarbon chain and wherein $n$ lies between the inclusive limits of 19 and 59. Compounds of the above type may be prepared by reacting preformed polyethylene glycols with fatty acids or, preferably, by reacting upon the fatty acid of radical $R_1$ with ethylene oxide until an average of $n+1$ mols of the latter have been taken up and subsequently esterifying the terminal hydroxyl group of the formed polyoxyethylene ester with the fatty acid of radical $R_2$. By whichever method the agent is prepared it is to be understood that in a given sample of any of my diesters there may be ethylene oxide chains of varying length and that $n$ represents the average number of radicals therein. Similarly, it is to be understood that the fatty acids whose acyl radicals are represented by $R_1$ and $R_2$ may be commercial grades of fatty acids containing appreciable quantities of acids closely related to the nominal fatty acid. Representative members of the generic class just described are, the oleic acid ester of polyoxyethylene stearate in which the average number of oxyethylene groups is 50, the stearic acid ester of polyoxyethylene stearate in which the average number of oxyethylene groups is 40, the arachidic acid ester of polyoxyethylene oleate in which the average number of oxyethylene groups is 60, the palmitic acid ester of polyoxyethylene myristate in which the average number of oxyethylene groups is 25, or the lauric acid ester of polyoxyethylene palmitate in which the average number of oxyethylene groups is 20.

The exact amount of addition agent to be employed in practicing my invention is not critical but may vary according to the properties desired in the final product and according to the choice of agent within the limits previously described. In general, the amount of addition agent employed is less than 0.5% and preferably is maintained between the inclusive limits of 0.05% and 0.2%.

A typical ice cream formula in accordance with this invention is the following:

| | Pounds |
|---|---:|
| 30% cream | 425 |
| Fluid milk | 367 |
| Powdered skim milk | 43.5 |
| Cane sugar | 120 |
| Anhydrous dextrose | 40 |
| Gelatin | 3.5 |
| Stearic acid ester of polyoxyethylene stearate in which the average number of oxyethylene groups is 40 | 2.0 |
| | 1000.0 |

Add flavor, as, e. g. vanilla.

The ingredients are compounded in the manner well known in the art and pasteurized before homogenizing and freezing.

Instead of two pounds of the stearic acid ester described in the above example, there may be alternatively employed one pound of the arachidic acid ester of polyoxyethylene oleate in which the average number of oxyethylene groups is 60, or 1.5 pounds of the lauric acid ester of polyoxyethylene palmitate in which the average number of oxyethylene groups is 20, etc., adjusting the weight of skim milk powder in each case to make the total mix weight equal 1000 pounds.

Application of the principle of my invention to other ice cream mixtures and to frozen confections generally will be obvious to those skilled in the art, from the above description and exemplary disclosures.

What I claim is:

1. A frozen-confection-mix containing a small proportion of a compound represented by the formula $R_1OCH_2(CH_2OCH_2)_nCH_2OR_2$ in which $R_1$ and $R_2$ are acyl radicals of at least one monobasic, unsubstituted, straight chain acid containing from 12 to 20 carbon atoms and containing not more than one carbon to carbon double bond, and in which the value of $n$ lies between the inclusive limits of 19 and 59.

2. A frozen-confection-mix in accordance with claim 1 which contains the said compound in a proportion of from 0.05% to 0.5%.

3. An ice cream mix containing from 0.05% to 0.2% of the stearic acid ester of polyoxyethylene oleate in which the average number of oxyethylene groups is 40.

KENNETH R. BROWN.

REFERENCES CITED

The following references are of record in the file of this patent:

UNITED STATES PATENTS

| Number | Name | Date |
| --- | --- | --- |
| 2,065,398 | Roth et al. | Dec. 22, 1936 |
| 2,398,950 | Moore | Apr. 23, 1946 |
| 2,400,834 | Gloahec | May 21, 1946 |
| 2,422,486 | Johnston | June 17, 1947 |
| 2,509,926 | Johnston | May 30, 1950 |

OTHER REFERENCES

"Atlas Spans and Tweens," Reprinted June 1945 by the Atlas Powder Co., Wilmington, Del., pp. 1, 16 and 17.